United States Patent
Abernathy et al.

(10) Patent No.: US 10,356,617 B2
(45) Date of Patent: Jul. 16, 2019

(54) MOBILE DEVICE TO PROVIDE CONTINUOUS AUTHENTICATION BASED ON CONTEXTUAL AWARENESS

(71) Applicant: QUALCOMM Incorporated, San Diego, CA (US)

(72) Inventors: Tara Abernathy, San Diego, CA (US); Eric Trexel, San Diego, CA (US); Vijayalakshmi Raveendran, Del Mar, CA (US); Rahshel Brown, San Diego, CA (US); Dallas Wiener, San Diego, CA (US); Gabriel Moura da Silva, San Diego, CA (US); Kabir Kasargod, San Diego, CA (US); Laura Hart, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/612,819

(22) Filed: Jun. 2, 2017

(65) Prior Publication Data

US 2018/0227755 A1     Aug. 9, 2018

Related U.S. Application Data

(60) Provisional application No. 62/456,600, filed on Feb. 8, 2017.

(51) Int. Cl.
*H04W 12/06* (2009.01)
*G06F 21/31* (2013.01)
*H04W 4/38* (2018.01)

(52) U.S. Cl.
CPC ............ *H04W 12/06* (2013.01); *G06F 21/31* (2013.01); *H04W 4/38* (2018.02); *G06F 2221/2139* (2013.01); *H04M 2250/12* (2013.01)

(58) Field of Classification Search
CPC .......................... H04W 12/06; H04M 2250/12
See application file for complete search history.

(56) References Cited

U.S. PATENT DOCUMENTS

| | | | | |
|---|---|---|---|---|
| 6,992,695 B1 * | 1/2006 | Simpson | .......... | G08B 13/19623 348/143 |
| 2013/0331119 A1 * | 12/2013 | Vaccari | .................. | H04W 4/21 455/456.1 |
| 2014/0282868 A1 * | 9/2014 | Sheller | .................... | G06F 21/31 726/3 |

(Continued)

FOREIGN PATENT DOCUMENTS

EP         3093737 A2     11/2016

OTHER PUBLICATIONS

International Search Report and Written Opinion—PCT/US2018/015109—ISA/EPO—dated May 2, 2018.

*Primary Examiner* — Qun Shen
(74) *Attorney, Agent, or Firm* — Hunter Clark PLLC

(57) ABSTRACT

Disclosed is a mobile device to authenticate a user. The mobile device may comprise: a first sensor; a second sensor to use more power than the first sensor; and a processor coupled to the first sensor and the second sensor. The processor may be configured to: collect data from the first sensor; determine if an environmental change occurred based on the collected data from the first sensor; engage the second sensor to collect data if the environmental change occurred; and modify a polling rate for the second sensor based on the collected data from the second sensor.

33 Claims, 8 Drawing Sheets

(56) References Cited

U.S. PATENT DOCUMENTS

| | | | |
|---|---|---|---|
| 2015/0135298 A1* | 5/2015 | Robison | G06F 21/31 |
| | | | 726/10 |
| 2015/0156567 A1* | 6/2015 | Oliver | H04W 4/80 |
| | | | 340/870.07 |
| 2015/0281904 A1* | 10/2015 | Vaccari | H04W 4/21 |
| | | | 455/456.3 |
| 2016/0087952 A1* | 3/2016 | Tartz | H04W 12/06 |
| | | | 455/411 |
| 2016/0210451 A1 | 7/2016 | Hwang et al. | |

\* cited by examiner

| CONTEXT INPUT | EXAMPLE | SECURITY | POWER | CONVENIENCE |
|---|---|---|---|---|
| 502 — 1. POLICY (HARD CONSTRAINT) | GOVERNMENT ISSUED PHONE | HIGH | MEDIUM | LOW |
| | GENERAL PHONE | MEDIUM | HIGH | HIGH |
| 504 — 2. APPLICATION USE CASE/USER CONTEXT/LoA | BANK APP | HIGH | MEDIUM | MEDIUM |
| | VIDEO COMMUNICATION | LOW | HIGH | HIGH |
| 506 — 3. AVAILABILITY AND CONFIDENCE OF SENSORS | PHONE IN POCKET | HIGH | HIGH | LOW |
| | PHONE IN HAND | MEDIUM | HIGH | HIGH |

MOBILE DEVICE TO PROVIDE CONTINUOUS AUTHENTICATION BASED ON CONTEXTUAL AWARENESS

CROSS REFERENCE TO RELATED APPLICATIONS

The present application claims priority to U.S. Provisional Patent Application No. 62/456,600, filed Feb. 8, 2017, entitled "Mobile Device to Provide Continuous Authentication Based on Contextual Awareness," the content of which is hereby incorporated by reference in its entirety for all purposes.

BACKGROUND

Field

The present invention relates to a mobile device that provides continuous authentication based on contextual awareness.

Relevant Background

User authentication is commonly required to access a mobile device, such as, a smart phone, a tablet, a laptop computer, etc. Further, authentication is often required to access certain types of applications or to interface with remote entities. Many types of authentication techniques, such as, passwords, fingerprints, voice inputs, etc., are presently utilized. Most present day authentication techniques on mobile devices are typically only discrete in nature, in which user authentication is based upon an explicit request for an explicit authentication input. For example, commonly deployed discrete authentication methods to authenticate a user to a mobile device may be a password or a fingerprint externally inputted by the user.

Mobile continuous authentication techniques that utilize passive authentication techniques in order to provide a high level of security using minimal power while still maintaining an adequate level of convenience to a user are sought after. These types of mobile continuous authentication techniques should be able to dynamically adjust the combination of security, power, and convenience.

SUMMARY

Aspects of the invention may relate to mobile device to authenticate a user. The mobile device may comprise: a first sensor; a second sensor to use more power than the first sensor; and a processor coupled to the first sensor and the second sensor. The processor may be configured to: collect data from the first sensor; determine if an environmental change occurred based on the collected data from the first sensor; engage the second sensor to collect data if the environmental change occurred; and modify a polling rate for the second sensor based on the collected data from the second sensor.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "mobile device" refers to any form of programmable computer device including but not limited to laptop computers, tablets, smartphones, televisions, desktop computers, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any computing device or data processing apparatus.

Figure 1:
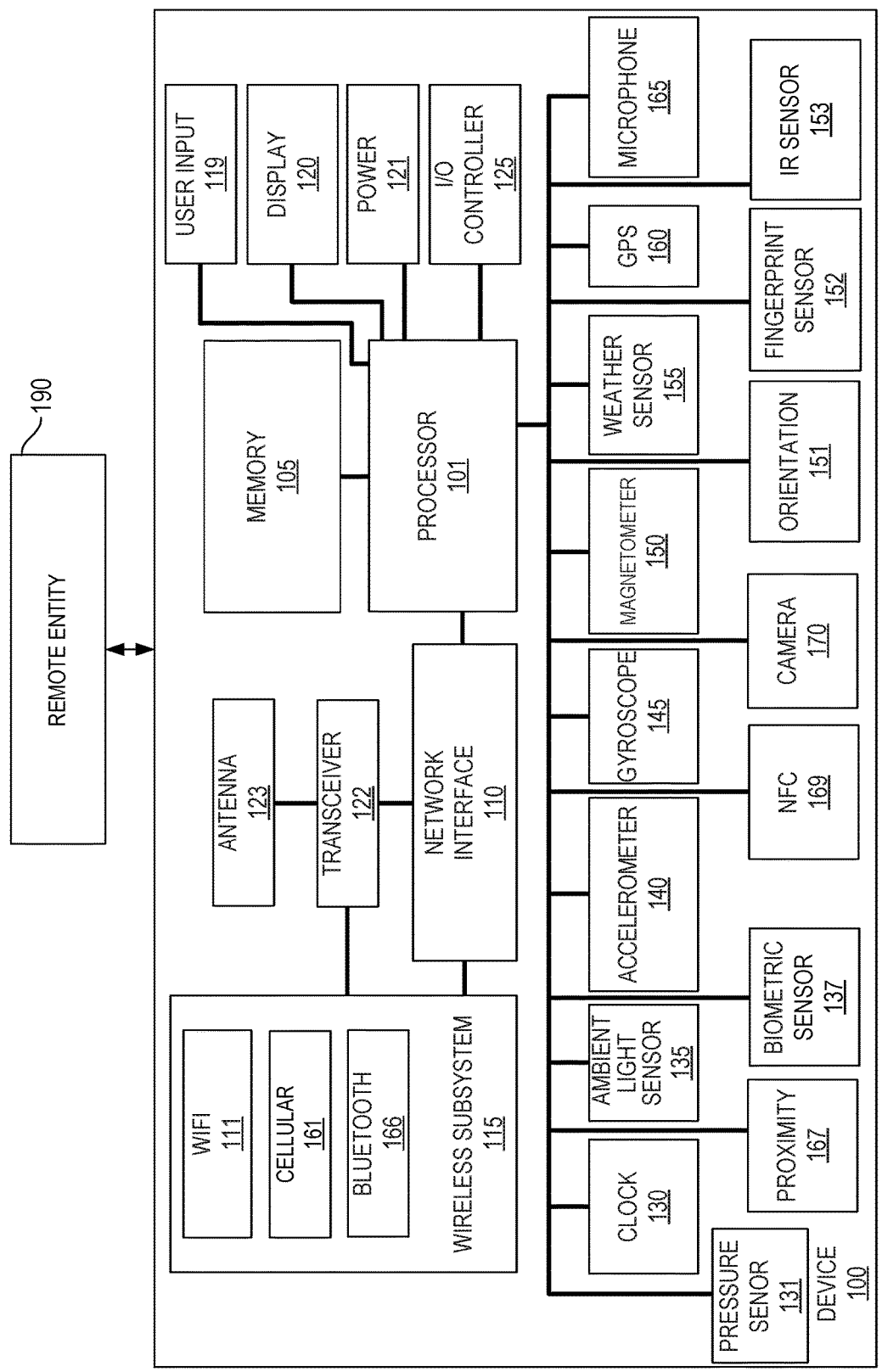
FIG. 1 is a diagram of a device in which aspects of the invention may be practiced.

FIG. 1 is block diagram illustrating an exemplary device in which embodiments of the invention may be practiced. The system may be a computing device (e.g., a mobile device 100), which may include one or more processors 101, a memory 105, I/O controller 125, and network interface 110. Mobile device 100 may also include a number of sensors coupled to one or more buses or signal lines further coupled to the processor 101. It should be appreciated that mobile device 100 may also include a display 120 (e.g., a touch screen display), a user interface 119 (e.g., keyboard, touch screen, or similar devices), a power device 121 (e.g., a battery), as well as other components typically associated with electronic devices. In some embodiments, mobile device 100 may be a transportable device, however, it should be appreciated that device 100 may be any type of computing device that is mobile or non-mobile (e.g., fixed at a particular location).

Mobile device 100 may include sensors such as: clock 130, pressure sensor 131, ambient light sensor (ALS) 135, biometric sensor 137 (e.g., EKG, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, proximity sensor 167, and near field communication (NFC) sensor 169. Further, sensors may include a microphone 165 and camera 170. Communication components may include a wireless subsystem 115 (Bluetooth 166, Wi-Fi 111, cellular 161), which may also be considered sensors, that are used to analyze the environment (e.g., position) of the device. In some embodiments, multiple cameras are integrated or accessible to the device. For example, mobile device 100 may have at least a front and rear mounted camera.

Memory 105 may be coupled to processor 101 to store instructions for execution by processor 101. In some embodiments, memory 105 is non-transitory. Memory 105 may store one or more programs, modules, engines, etc., to implement embodiments described below that are implemented by processor 101. Memory 105 may also store data from integrated or external sensors.

Mobile device 100 may include one or more antenna(s) 123 and a transceiver 122. The transceiver 122 may be configured to communicate bi-directionally, via the antenna(s) and/or one or more wired or wireless links, with one or more networks, in cooperation with network interface 110 and wireless subsystems 115. Network interface 110 may be coupled to a number of wireless subsystems 115 (e.g., Bluetooth 166, Wi-Fi 111, Cellular 161, or other networks) to transmit and receive data streams through a wireless link to/from a wireless network, or may be a wired interface for direct connection to networks (e.g., the Internet, Ethernet, or other wireless systems). Mobile device 100 may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a Wi-Fi (802.11x) communication system suitable for communicating with one or more wireless access points.

Mobile device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, 5G, GSM, etc. Additionally, any other type of wireless networking technologies may be used, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT).

Thus, device 100 may be a: mobile device, wireless device, cellular phone, personal digital assistant, mobile computer, wearable device (e.g., head mounted display, wrist watch, virtual reality glasses, etc.), internet appliance, gaming console, digital video recorder, e-reader, robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, mobile device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc., which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

It should be appreciated that embodiments will be hereinafter described that may be implemented through the execution of instructions, for example as stored in the memory 105 or other element, by processor 101 of mobile device 100 and/or other circuitry of device and/or other devices. Particularly, circuitry of the device, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like. The functions of each unit or module within the mobile device 100 may also be implemented, in whole or in part, with instructions embodied in a memory, formatted to be executed by one or more general or application-specific processors.

Various terminologies will be described to aid in the understanding of the embodiments. Sensor inputs may refer to any input from any of the previously described sensors, such as: clock 130, pressure sensor 131, ambient light sensor (ALS) 135, biometric sensor 137 (e.g., EKG, etc.), accelerometer 140, gyroscope 145, magnetometer 150, orientation sensor 151, fingerprint sensor 152, weather sensor 155 (e.g., temperature, wind, humidity, barometric pressure, etc.), Global Positioning Sensor (GPS) 160, infrared (IR) sensor 153, microphone 165, proximity sensor 167, near field communication (NFC) sensor 169, camera 170, etc. Some of the sensors may be utilized for particular authentication techniques which may include: microphone 165 (e.g., voice scan), camera 170 (facial scan), IR sensor 153 (iris scan), etc. It should be appreciated these are just examples and a wide variety of sensors may be used for authentication methods.

Further, contextual information or contextual inputs may provide passive authentication techniques (e.g., not known to the user) that may relate to the current environment or current events that the mobile device 100 is currently in as monitored by a "contextual sensor". Therefore, a contextual sensor may be considered to be any type of sensor that relates to the current context situation of the mobile device which may relate to such contextual sensing information as: pressure, light; acceleration; weather; orientation; location, proximity, sound, etc. Accordingly, examples of contextual sensors may include: pressure sensor 131, ambient light sensor 135; accelerometer 140; weather sensor 155; orientation sensor 151; GPS 160, proximity sensor 167; microphone 165, etc. These merely being examples of context inputs and contextual sensors. Also, contextual inputs may also be characterized as data collected about the user, such as: transaction amounts during purchases, user spending data, crowd source data, demographic data, websites visited, emails, phone calls made, files opened, networks used, applications used, etc.

It should be noted that one group of processor that do not utilize large amounts of power from power source 121 may be termed "first sensors" or "low power sensors" and may include: clock 130; pressure sensor 131; ambient light sensor 135; accelerometer 140; gyroscope 145; magnetometer 150; weather sensor 155; GPS 160; proximity sensor 167; biometric sensor 137; NFC sensor 169; orientation sensor 151; etc. It should be noted another group of sensors that utilize larger amounts of power from power source 121 may be termed "second sensors" or "high power sensors" and may include: microphone 165; camera 170; IR sensor 153; etc. It should be appreciated that these are just examples of low power sensors and high power sensors and that any suitable type of sensor may be utilized. Further, it should be noted that a second sensor/high power sensor generally uses more power than a first sensor/low power sensor from a power source. It should be noted that the terms second sensor and high power sensor may be used interchangeably hereafter and similarly the terms first sensor and low power sensor may be utilized hereafter interchangeably.

Mobile device 100 may provide a high level of security using minimal power while maintaining an adequate level of convenience to the user. In particular, as will be described, mobile device 100 dynamically adjusts the combination of security, power, and convenience requirements to provide the functionality that is needed at the time. Further, as will be described, embodiments relate to utilizing methods and procedures implemented by the mobile device 100 such that the mobile device may change its architecture and behavior in real time based on contextual information to provide the functionality requested. In particular, as will be described, mobile device 100 attempts to give each use case and application an optimized hardware and software architecture on the fly, while taking into account security, power usage, and convenience requirements or settings.

In one embodiment, as will be described, mobile device 100 determines when updated environment data may be available using as little power as possible in the process. If high power sensors (e.g., power hungry sensors) are engaged to collect data when the environment has little to no change since the last collection, energy is wasted. In particular, by polling sensors frequently when no new data is being presented, energy is being wasted. As will be described, mobile device 100 monitors device usage via low power sensors to determine environmental changes and, when an environmental change has occurred, may then attempt to authenticate a user.

In one embodiment, mobile device 100 may be utilized to authenticate a user. As previously described, mobile device 100 may include a variety of first sensors (e.g., low power sensors) and second sensors (e.g., high power sensors). Processor 101 may be coupled to the various first sensors and second sensors, wherein the second sensors use more power than the first sensors. In one embodiment, processor 101 may be configured to collect data from a first sensor; determine if an environmental change has occurred based on the collected data from the first sensor; and engage a second sensor to collect data if the environmental change has occurred. Further, processor 101 may be configured to: modify a polling rate for the second sensor based on the collected data from the second sensor. It should be noted that a second sensor/high power sensor generally uses more power than a first sensor/low power sensor from a power source. It should be noted that the terms second sensor and high power sensor may be used interchangeably hereafter and similarly the terms first sensor and low power sensor may be utilized hereafter interchangeably.

Various illustrations of the modification of the polling rate for the high power sensor will be described hereafter. Further, based upon the collected data from the high power sensor, the user may be authenticated, the high power sensor turned off, and data collection may be transferred back to the low power sensor again to determine environmental changes. It should be appreciated that the user may be authenticated to use the mobile device 100, to use an application or feature of the mobile device 100, or be authenticated to a remote entity 110 (e.g., a server (bank, service provider, on-line store, etc.). Various particular examples of these implementations will be hereafter described.

Figure 2:
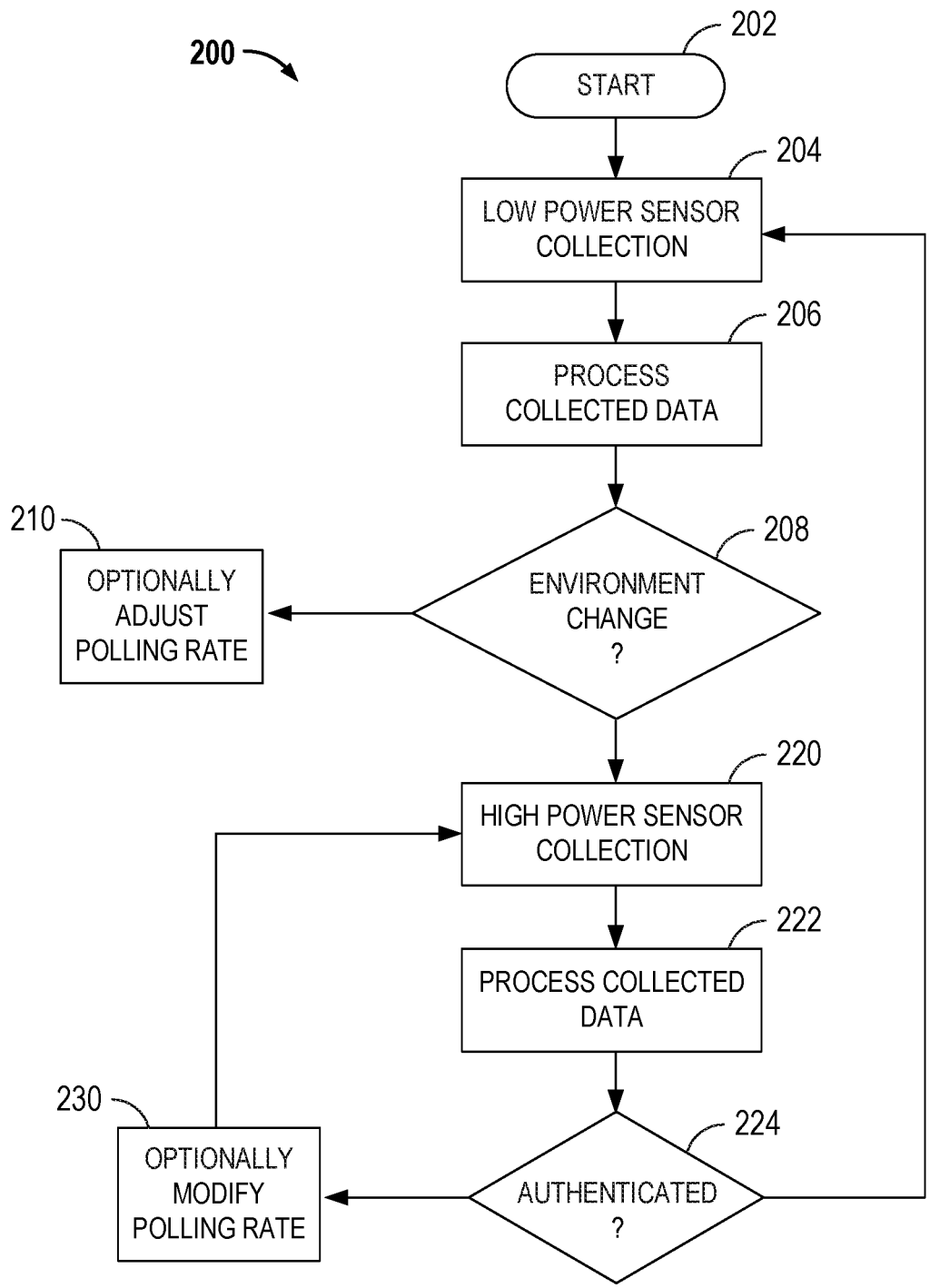
FIG. 2 is flow diagram illustrating a process to implement dynamic polling.

With additional reference to FIG. 2, a process 200 to implement dynamic polling will be described. The process 200 starts at block 202. At block 204, low power sensor data collection is pursued in which data is collected from a low power sensor of the mobile device. At block 206, the low power sensor collected data is processed. At decision block 208, process 200 determines if an environmental change has occurred based on the processed collected data from the low power sensor. If no change has occurred, then the polling rate of the low power sensor may be adjusted (block 210) and low power sensor data collection continues (block 204).

However, if an environmental change has occurred at decision block 208, a high power sensor of the mobile device may be engaged such that data is collected from the high power sensor (block 220). The collected high power sensor data is then processed (block 222) to determine whether or not a user is authenticated (decision block 224). Based upon the collected processed data from the high power sensor, if the user is authenticated, the high power sensor may be turned off and the process may return to block 204 where data is collected from the low power sensor and environmental changes are attempted to be determined, as previously described.

If the user is not authenticated, the polling rate may be optionally modified (block 230) and high power sensor data collection 220 may continue, until the user is authenticated.

Various examples will be hereafter described. It should be appreciated that examples of low power sensors may include: pressure sensor 131, accelerometer 140, gyroscope 145, GPS 160, etc., as well as other types of sensor devices that typically utilize a relatively low degree of power. Examples of high power sensors may include: camera 170 to collect facial data, microphone 165 to collect voice data, IR sensor 153 to collect eye data, well as other types of sensor devices that typically utilize a higher degree of power. Also, as will be described, as to modification of the polling rate for the high power sensor, the polling rate may be decreased if the collected data from the high power sensor increases the potential authentication of the user. Also, the polling rate for the high power sensor may be modified by being held constant or increased if the collected data from the high power sensor is inconclusive for authentication. Various examples will be hereafter described.

Therefore, as previously described, process 200 implemented by processor 101 of mobile device 100 implements sensor usage throttling by first querying a set of low power sensors for activity. These low power sensors may include: pressure sensor 131, accelerometer 140, gyroscope 145, orientation sensor 151, GPS 160 etc.; and may be used to determine if a mobile device 100 has been picked up, left on a table, rotated to a different orientation, or moved a significant distance. These events may be used in a sequence to classify the type of action that has been performed. This action may then be used to determine whether a high power sensor should be engaged based upon a determined environmental change 208. Also, it should be noted that WiFi 111 and Bluetooth 166 may be used to determine significant moved distance or location alone or in combination with GPS 160. It should be appreciated that any of these types of activities of the mobile device detected by a low power sensor (e.g., being picked up, rotated, movement, pressure, measured distance change, light, or any type of measurable physical status or change of the environment that the mobile device is in, etc.) may be used in determining an environmental change, as will be described.

Once a high power sensor is engaged, the output of the high power sensor may be used to determine a polling rate. If data that is useful in authenticating the user (e.g., a genuine face) is captured from the high powered sensor, the mobile device 100 may decide to slow or decrease the polling rate by a certain amount (modify polling rate 230) based on each subsequent useful result. On the other hand, if the results are inconclusive, the polling rate may be modified by being held constant or increased to insure that more contextual data (e.g., more face images) may be captured (e.g., work harder to capture a face). Also, mobile device 100 may employ machine learning techniques in order to determine sequences of low power events that constitute change of environment (block 208).

An example will now be given of facial recognition used with dynamic polling. With additional reference to FIGS. 3A-3C, an example process 300 will be described. To begin with, low power sensor data collection, as previously described, starts (block 302). In particular, at block 304, low power sensor data is collected (e.g., from accelerometer, gyroscope, pressure sensor, orientation sensor, GPS, etc.). At block 306, feature extraction is performed on the collected data from the low power sensor. At decision block 308, process 300 determines whether a desirable position of the mobile device 100 is available. As an example, if mobile device 100 is in a position that would suggest that a user's face may possibly be captured by the front facing camera, a desirable position has been obtained. If not, at decision block 310, based on data collection over time, it is determined if there is an indication that the mobile device 100 is moving towards a desirable capture state or away from one. If the mobile device 100 is determined to be moving away from a desirable capture state then polling is decreased (block 314) and process 300 continues to collect low power sensor collection data (block 304). On the other hand, if the mobile device 100 is determined to be moving towards a desirable capture state, polling is increased (block 312) and low power sensor data continues to be collected at block 304 and process 300 continues.

On the other hand, if a desirable position has been obtained at decision block 308 (e.g., a possible capturing of the front face of a user by camera 170), then at block 320, an environmental change has occurred and a high power sensor is engaged, and in particular, in this example, the camera 170 is turned on (block 320). Next, data is collected from the high power sensor, such as, capture image frame (block 322) from the camera. Continuing with this example, at block 324, face detection processing occurs by processing the captured image frames. At decision block 326 it is determined whether a face has been detected. If not, process 300 moves to decision block 328, where it is determined whether after n consequent empty frames it is assumed that a face will not be present for this capture attempt, in which case, the camera is turned off (block 340). However, if n empty frames have not been obtained at decision block 328 then process 300 moves to block 330 where the camera is turned off, a time wait of n milliseconds (block 332) is performed, the wait time may be increased (block 334), and the camera is then turned on again at block 320 such that capture image frame process continues to obtain possible facial detection (decision block 326).

However, if a face is detected at decision block 326, face recognition (block 350) is conducted to determine at decision block 352 the probability of whether the face in the captured frame is of a genuine user. If the captured frame is not likely a genuine user, then the polling of the camera 170 for facial recognition may be increased (block 354) and process 300 returns back to the detection phase of capturing image frames (block 322). However, if a genuine user has been detected at decision block 352, then process 300 moves to decision block 356 and it is determined whether n consecutive frames of the genuine user have been obtained, an if so, then the user may be noted as authenticated and the camera turned off block 340, such that the mobile device 100 may return to the low power sensor monitoring mode. However, at decision block 356, if n consecutive frames of the genuine user have not yet been met, such that the user is not yet authenticated, the polling of the image frames may be decreased (block 360) and process 300 may return to the detection portion to continue to capture image frames.

Figure 3A:
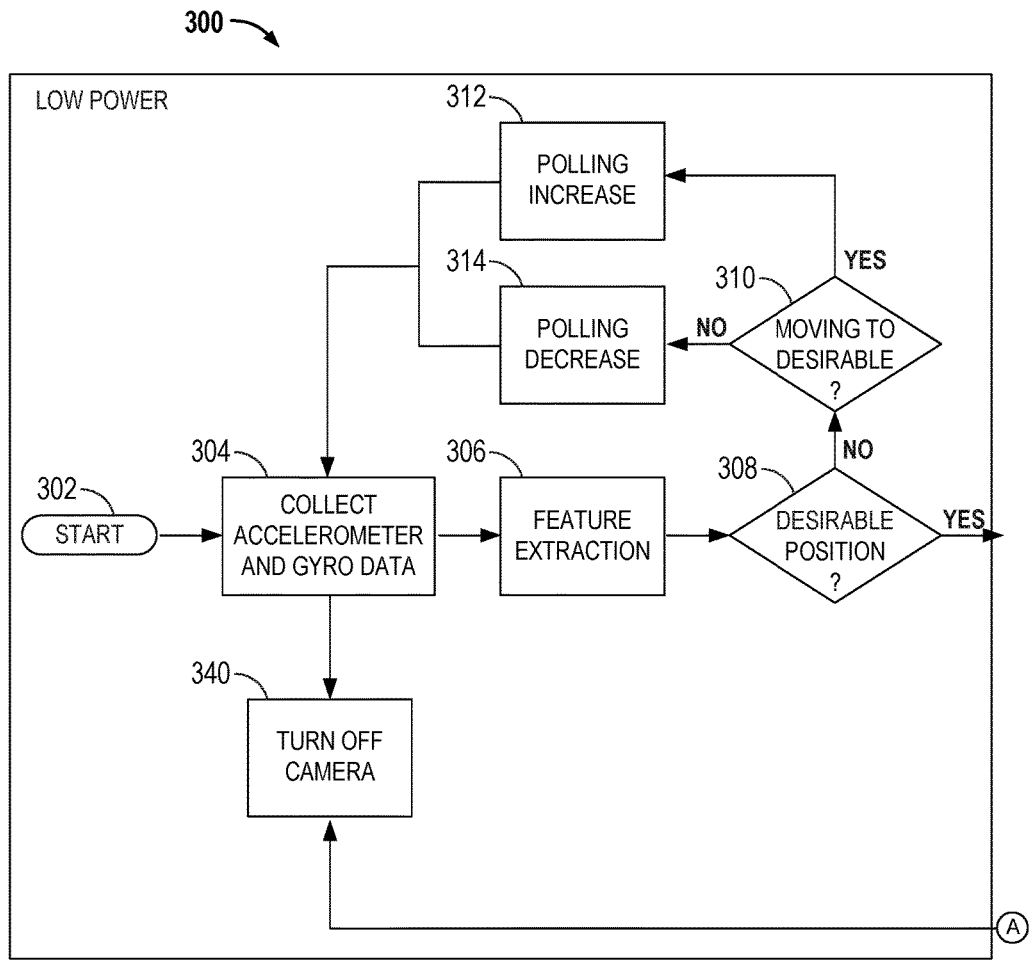
FIGS. 3A-3C is a flow diagram illustrating a process to implement facial recognition used with dynamic polling.
Figure 3B:
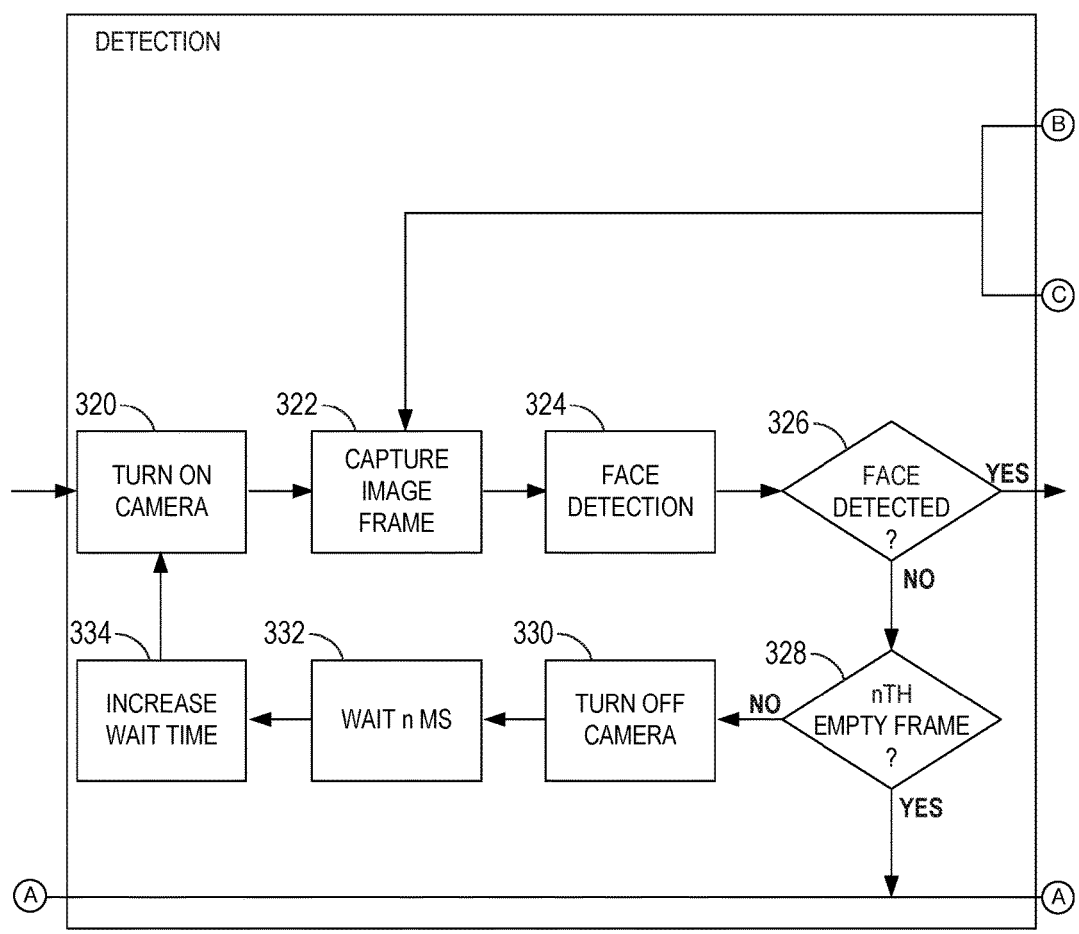
Figure 3C:
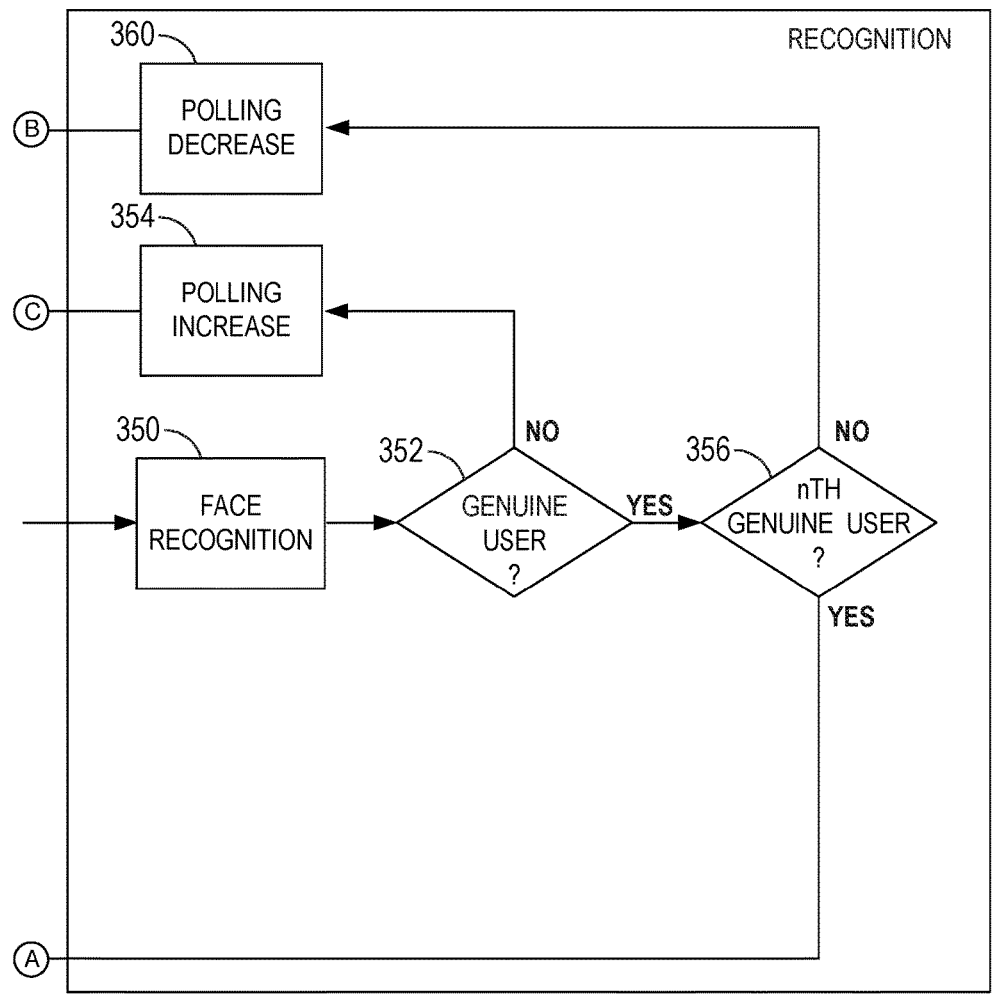

As previously described, FIGS. 3A-3C illustrates a dynamic polling operation utilizing facial recognition with a high power sensor (e.g., a camera 170). It should be appreciated that the same type of dynamic polling may be utilized in substantial similar operations by utilizing a microphone 165 for collecting voice data for voice recognition, utilizing an IR sensor 153 for eye recognition, etc. It should be appreciated that a wide variety of different types of dynamic polling for high power sensors may be utilized to authenticate a user. It should be appreciated that both the low power sensor operations, high power sensor operations, etc., previously described provide authentication based upon passive contextual information that does not require explicit user input.

According to one additional embodiment, an algorithm for using contextual data to adjust the operating parameters of the active continuous security system implemented by processor 101 of mobile device 100 may be utilized. For example three factors may be particularly used: security, convenience, and power. It should be noted that for each factor an increase in one may constitute a decrease in another. As examples, increased security may decrease convenience, whereas increasing both security and convenience may decrease power efficiency, etc. Mobile device 100 may use information about the current location of the mobile device, the current security of the mobile device, and past sensor observations to determine an appropriate balance between all three factors (e.g., security, convenience, and power), and continually change the balance over time. Further, discrete observations such as invocation of security protocols, immediate authentication requests, and other acts of biometric signals may also be considered in determining the operation parameters of the mobile device 100. This algorithm may be scalable and able to support additional information in the future.

Figure 4A:
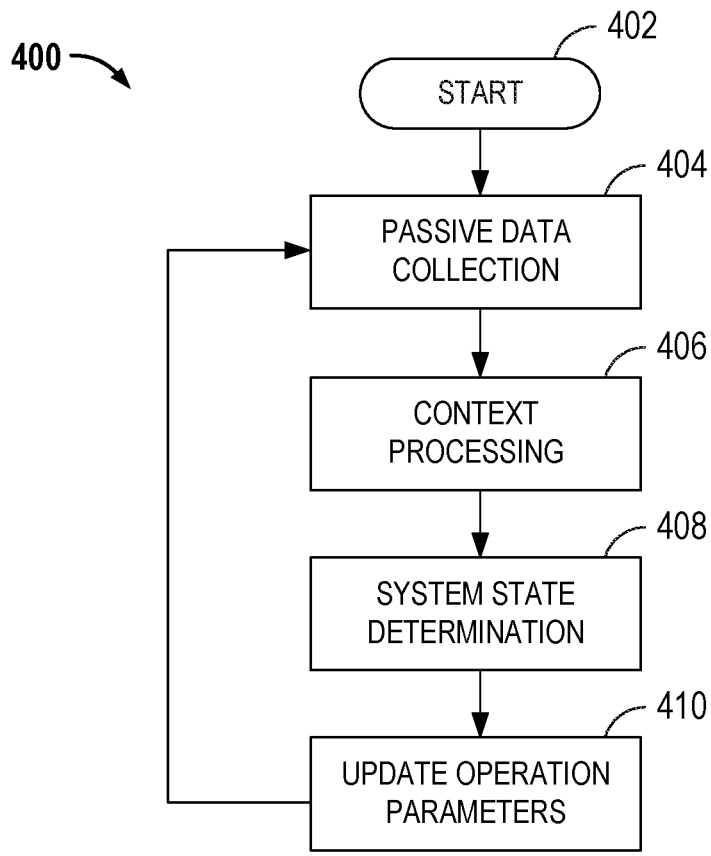
FIG. 4A is a flow diagram illustrating a process to update operation parameters.

For example, with reference to FIG. 4A, a process 400 may be used to update the operation parameters of the mobile device 100. Process 400 stars at block 402. At block 404, passive data collection may be utilized to collect data. Further, context processing of the data may occur at block 406. At block 408, the state of the system may be determined. At block 410, based upon the passive data collection, context processing and state determination, operation parameters (e.g., security, convenience, and power) may be updated.

Figure 4B:
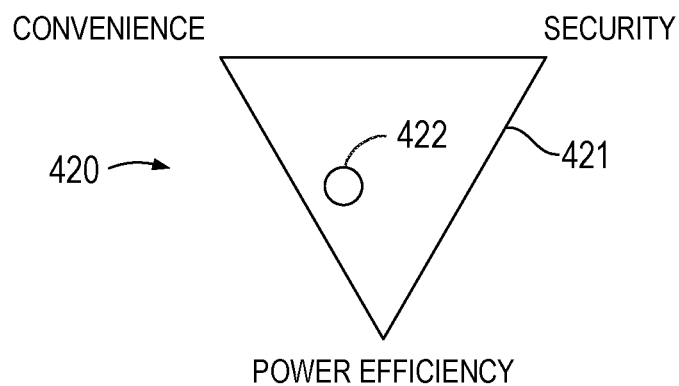
FIG. 4B is a diagram illustrating operation parameters set as a circle in the triangle of a trident system.

For example, with reference to FIG. 4B, operation parameters may be set at circle 422 in the triangle 421 of this trident system 420. In this example, less weight is given to security and more weight is given to power efficiency and convenience.

As an illustration of the trident system (e.g., convenience, security, power efficiency) different examples may be illustrated. For example, with reference to FIG. 5A, various examples will be described. For example, in this illustration, the policy of the mobile device is set to hard constraint 502. This hard constraint sets the limits of the various requirements. For example, for a government issued phone, security may be set to high, power may be set to medium, and convenience may be set to low. As another of example, for a general phone, security may be set to medium, power may be set to high, and convenience may be set to high. The next influence on requirements comes from the level of assurance or the use case at hand. As another example, 504 for an application use case/user context/level of assurance (LoA), various examples will be described. For example, for a bank application, security may be set to high, power set to medium, and convenience set to medium. For a video communication, security may be set to low, power set to high, and convenience set to high. The last and least influential component to alter the requirements is the internal device context (e.g., the availability and confidence of sensors). As yet another example for availability and confidence of sensors 506, various examples will be provided. For example, for a phone in pocket, security may be set to high, power set to high, and convenience set to low. As another example phone in hand, security may be set to medium, power set to high, and convenience set to high.

Figures 5A, 5B:
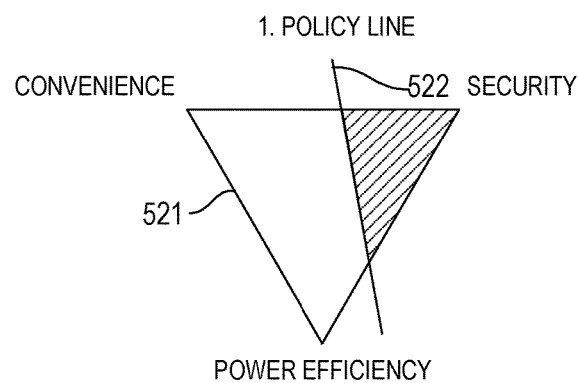
FIG. 5A is a diagram of a table illustrating examples of a policy that is implemented.
FIG. 5B is a diagram illustrating hard constraint operation parameters set in the triangle of the trident system.

With reference to FIG. 5B, the policy of the mobile device 100 may be set to the hard constraint. The hard constraint policy line 522 can be seen cutting across triangle 521. The policy set for the mobile device 100 is hard constraint which puts hard limits on the requirements. As examples, items 2 and 3, must remain to the right of the policy line 522 in triangle 521.

As has been described, embodiments relate to having the mobile device 100 under the control of processor 101 implement an intelligent hardware manager. In this way, multiple different hardware components with different optimizations may be utilized for a particular function. For example, a digital signal processor (DSP) may be utilized vs. a general processing unit (GPU), etc. Therefore, mobile device 100 may implement an intelligent hardware manager to determine how, when, and what hardware components are utilized for a particular function or job such that these functions may be intelligently controlled by the intelligent hardware manager in an upper layer of software.

Figure 6:
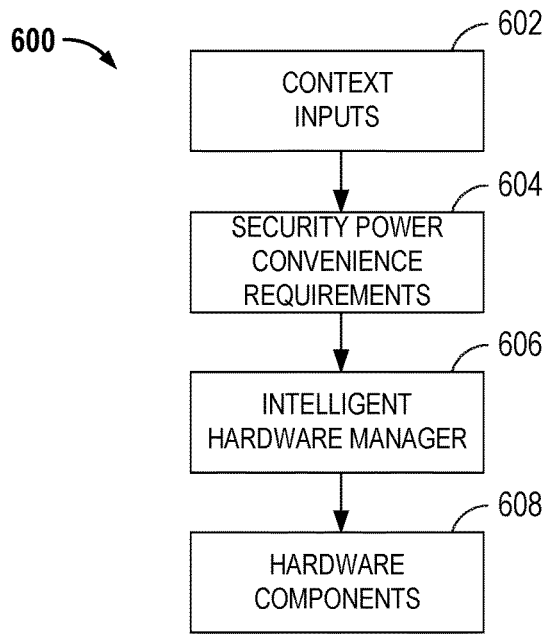
FIG. 6 is a flow diagram illustrating a process to select hardware components by a hardware manager.

As an example with brief reference to FIG. 6, a process 600 will be described. In process 600, both context inputs (block 602) and security/power/convenience requirements (block 604) are inputted to the intelligent hardware manager (block 606). At block 608, hardware components are selected by the intelligent hardware manager to perform a function in an optimal manner based upon the context inputs and the requirements.

Figure 7:
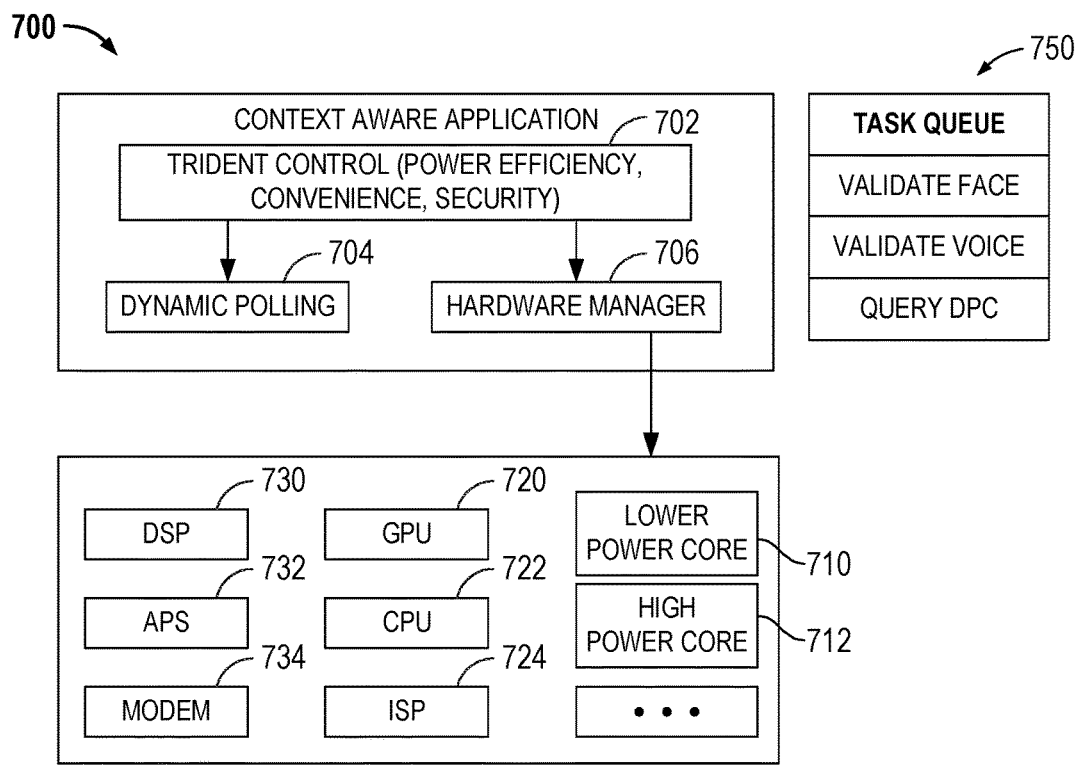
FIG. 7 is a diagram of top level architecture of the context aware system.

With additional reference to FIG. 7, an example of this top level architecture 700 will be described. In this example, a context aware application including the previously described trident control (e.g., power efficiency, convenience, and security) 702, the previously described dynamic polling features 704, and the previously described hardware manager 706, in combination, control the hardware based upon the previously described polling and control requirements. It should be appreciated that in one embodiment processor 101 of mobile device 100 may implement the context aware application.

In this example, the hardware components may include: a GPU 720; a CPU 722; an image signal processor (ISP) 724; a digital signal processor (DSP) 730, an application processor (APS) 732; a modem 734; a low power core 710; a high power core 712; etc. It should be appreciated that these are just examples of hardware components, and that any suitable hardware components for a mobile device may be utilized. Further, the previously described hardware components of FIG. 1 may likewise be controlled by the context aware application.

In this embodiment, hardware manager 706 utilizing trident control 702 (e.g., power efficiency, convenience, and security requirements) and dynamic polling 704, as previously described, may intelligently select the hardware best suited for a particular function or job based on the context of what combination of convenience, security, and power usage is needed at the time. This combination could be driven by the level of assurance needed, the use case, etc., as previously described. It should be appreciated that this differs from typical schedulers in that decisions are made using inputs from a context of where and how a mobile device 100 is being used and also past and current external information to predict how the mobile device 100 will be used in the near future. In particular, by utilizing this context aware system 700 that utilizes trident control 702, dynamic polling 704, and hardware manager 706, mobile device 100 may tailor its security, power efficiency, and convenience with this hybrid architecture that utilizes intelligent hardware manager 306. Thus this hardware architecture is a dynamic system that operates according to changing requirements.

Utilizing this type of context aware system, various task queues 750 may be implemented. For example, a query of the device position classifier (DPC) may be commanded by hardware manager 706. As previously described, low power sensors e.g., accelerometer, gyroscope, pressure sensor, GPS, etc., through a polling process may determine if a desirable position has been met to utilize high power sensors (e.g., camera, microphone, etc.) for validation purposes. These low power sensors may utilize low power core 720. Further, hardware manager 706 may command task queues 750 for face validation utilizing the camera (e.g., a high power sensor utilizing the high power core 712) or voice validation utilizing the microphone (e.g., a high power sensor utilizing the high power core 712). These validation techniques have been previously described in detail.

It should be appreciated that the external and internal signals from the hardware of the mobile device 100 are captured and interpreted contextually. External signals may include an environment change or a change in the use case. Environment changes may be anything from the noise level in the room to the fact that the mobile device 100 is now outdoors instead of the office. The use case may depend on what biometric signals are available. For example, whether there is a face to monitor and score or a voice to monitor and score. An internal signal may be the level of authentication needed for the application currently at use. For example, if the mobile device 100 is being brought into a sensitive compartment information facility (SCIF) and/or to authenticate someone to be given access to a SCIF then a high level of assurance may be needed. Whereas authentication to email may require a low level.

At this point, all the context signals and information may be passed to state control for processing as to what requirements are needed. The state control then determines what state it is currently in, and the state it needs to be in, given the new context information. The state control may then update its operation parameters to the correct combination of security, power efficiency, and convenience.

The operation parameters may then be sent to the hardware manager 706. The hardware manager 706 may then decide to run the job/tasks slated for execution based on the parameters and what hardware components to use. For example, if power usages needs to be favored because there has not been much change in context information, then low power sensors may be given the task to collect data instead of high power sensors. However, this may slightly compromise user convenience if the sensor's response times are not as fast higher powered sensors. This process may continuously update in real time.

As has been previously described, embodiments relate to utilizing methods and procedures implemented by the mobile device 100 such that mobile device 100 may change its architecture and behavior in real time based on contextual information to provide the functionality requested. In particular, as has been described, mobile device 100 attempts to give each use case and application an optimized hardware and software architecture on the fly, while taking into account security, power usage, and convenience requirements or settings.

It should be appreciated that these are merely examples of the previously described embodiments. It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods, modules, or processes in accordance with embodiments of the invention. For example, such a program may be implemented in firmware or software (e.g. stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, 5G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, a set-top box, or any other suitable device. These devices may have different power and data requirements Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile device comprising:
   a first sensor;
   a second sensor to use more power than the first sensor; and
   a processor coupled to the first sensor and the second sensor, the processor configured to:
   collect data from the first sensor;
   determine that an environmental change has occurred based on the collected data from the first sensor, wherein the processor is configured to determine, based on the data from the first sensor, that the mobile device is in a position in which the second sensor can be used to collect data that can be used to authenticate a user of the mobile device, and wherein the processor is configured to determine whether the mobile device is moving toward or moving away from the position in which the second sensor can be used to collect data;
   engage the second sensor to collect data responsive to the environmental change having occurred; and
   modify a polling rate for the second sensor based on the collected data from the second sensor and based on whether the mobile device is moving toward or moving away from the position in which the second sensor can be used to collect data.

2. The mobile device of claim 1, wherein, the polling rate for the second sensor is decreased responsive to the collected data from the second sensor increasing a potential authentication of a user.

3. The mobile device of claim 1, wherein, the polling rate for the second sensor is held constant or increased responsive to the collected data from the second sensor being inconclusive for authentication.

4. The mobile device of claim 1, wherein, based upon the collected data from the second sensor, a user of the mobile device is authenticated, the second sensor is turned off, and data is collected from the first sensor to determine the environmental change.

5. The mobile device of claim 1, wherein, responsive to the environmental change not occurring, the polling rate of the first sensor is modified.

6. The mobile device of claim 1, wherein, the first sensor comprises at least one of an accelerometer, a gyroscope, or a global positioning system.

7. The mobile device of claim 1, wherein, the second sensor comprises a camera to collect facial data of a user of the mobile device.

8. The mobile device of claim 1, wherein, the second sensor comprises a microphone to collect voice data of a user of the mobile device.

9. A method to authenticate a user of a mobile device comprising:
   collect data from a first sensor of the mobile device;
   determine that an environmental change has occurred based on the collected data from the first sensor by determining, based on the data from the first sensor, that the mobile device is in a position in which the second sensor can be used to collect data that can be used to authenticate a user of the mobile device, and wherein the processor is configured to determine whether the mobile device is moving toward or moving away from the position in which the second sensor can be used to collect data;
   engage a second sensor of the mobile device to collect data responsive to the environmental change having occurred; and
   modify a polling rate for the second sensor based on the collected data from the second sensor and based on whether the mobile device is moving toward or moving away from the position in which the second sensor can be used to collect data.

10. The method of claim 9, further comprising decreasing the polling rate for the second sensor responsive to the collected data from the second sensor increasing a potential authentication of the user.

11. The method of claim 9, further comprising holding the polling rate for the second sensor constant or increasing the polling rate for the second sensor, responsive to the collected data from the second sensor being inconclusive for authentication.

12. The method of claim 9, wherein, based upon the collected data from the second sensor, the user is authenticated, the second sensor is turned off, and data is collected from the first sensor to determine the environmental change.

13. The method of claim 9, wherein, responsive to the environmental change not occurring, modifying the polling rate of the first sensor.

14. The method of claim 9, wherein, the first sensor comprises at least one of an accelerometer, a gyroscope, or a global positioning system.

15. The method of claim 9, wherein, the second sensor comprises a camera to collect facial data of the user.

16. The method of claim 9, wherein, the second sensor comprises a microphone to collect voice data of the user.

17. A non-transitory computer-readable medium including code that, when executed by a processor, causes the processor of a mobile device to:
collect data from a first sensor;
determine that an environmental change has occurred based on the collected data from the first sensor by determining, based on the data from the first sensor, that the mobile device is in a position in which the second sensor can be used to collect data that can be used to authenticate a user of the mobile device, and wherein the code that causes the processor to determine that an environmental change has occurred further comprises code that causes the processor to determine whether the mobile device is moving toward or moving away from the position in which the second sensor can be used to collect data;
engage a second sensor to collect data if the environmental change occurred; and
modify a polling rate for the second sensor based on the collected data from the second sensor and based on whether the mobile device is moving toward or moving away from the position in which the second sensor can be used to collect data.

18. The computer-readable medium of claim 17, further comprising code to decrease the polling rate for the second sensor responsive to the collected data from the second sensor increasing a potential authentication of a user.

19. The computer-readable medium of claim 17, further comprising code to hold the polling rate for the second sensor constant or increase the polling rate for the second sensor, responsive to the collected data from the second sensor being inconclusive for authentication.

20. The computer-readable medium of claim 17, wherein, based upon the collected data from the second sensor, further comprising code to: authenticate a user of the mobile device and turn off of the second sensor.

21. The computer-readable medium of claim 17, wherein, if the environmental change does not occur, further comprising code to modify the polling rate of the first sensor.

22. The computer-readable medium of claim 17, wherein, the first sensor comprises at least one of an accelerometer, a gyroscope, or a global positioning system.

23. The computer-readable medium of claim 17, wherein, the second sensor comprises a camera to collect facial data of a user of the mobile device.

24. The computer-readable medium of claim 17, wherein, the second sensor comprises a microphone to collect voice data of a user of the mobile device.

25. A mobile device to authenticate a user comprising:
means for collecting data from a first sensor;
means for determining that an environmental change has occurred based on the collected data from the first sensor, the means for determining that the environmental change occurred further comprising means for determining, based on the data from the first sensor, that the mobile device is in a position in which the second sensor can be used to collect data that can be used to authenticate a user of the mobile device, and the means for determining that an environmental change has occurred further comprise means for determining whether the mobile device is moving toward or moving away from the position in which the second sensor can be used to collect data;
means for engaging a second sensor to collect data if the environmental change occurred; and
means for modifying a polling rate for the second sensor based on the collected data from the second sensor and based on whether the mobile device is moving toward or moving away from the position in which the second sensor can be used to collect data.

26. The mobile device of claim 25, further comprising means for decreasing the polling rate for the second sensor responsive to the collected data from the second sensor increasing a potential authentication of the user.

27. The mobile device of claim 25, further comprising means for holding the polling rate for the second sensor constant or means for increasing the polling rate for the second sensor, responsive to the collected data from the second sensor being inconclusive for authentication.

28. The mobile device of claim 25, wherein, based upon the collected data from the second sensor, the user of the mobile device is authenticated, the second sensor is turned off, and data is collected from the first sensor to determine the environmental change.

29. The mobile device of claim 25, wherein, responsive to the environmental change not occurring, further comprising means for modifying the polling rate of the first sensor.

30. The mobile device of claim 25, wherein, the first sensor comprises at least one of an accelerometer, a gyroscope, or a global positioning system.

31. The mobile device of claim 25, wherein, the second sensor comprises a camera to collect facial data of the user of the mobile device.

32. The mobile device of claim 25, wherein, the second sensor comprises a microphone to collect voice data of the user of the mobile device.

33. The mobile device of claim 1, wherein the processor is configured to decrease the polling rate for the second sensor responsive to the mobile device moving away from the position in which the second sensor can be used to collect data, and wherein the processor is configured to increase the polling rate for the second sensor responsive to the mobile device moving toward the position in which the second sensor can be used to collect data.

* * * * *